Jan. 14, 1964 K. SPANGENBERG 3,118,110
RADIO FREQUENCY SPECTRUM ANALYZER INCLUDING
DISPERSIVE TRAVELING WAVE TUBE ELEMENTS
Filed July 15, 1952 3 Sheets-Sheet 1

INVENTOR
KARL SPANGENBERG
BY
Paul B. Hunter
ATTORNEY

Jan. 14, 1964

K. SPANGENBERG 3,118,110

RADIO FREQUENCY SPECTRUM ANALYZER INCLUDING
DISPERSIVE TRAVELING WAVE TUBE ELEMENTS

Filed July 15, 1952

3 Sheets-Sheet 2

INVENTOR
KARL SPANGENBERG
BY
Paul B. Hunter
ATTORNEY

Jan. 14, 1964 K. SPANGENBERG 3,118,110
RADIO FREQUENCY SPECTRUM ANALYZER INCLUDING
DISPERSIVE TRAVELING WAVE TUBE ELEMENTS
Filed July 15, 1952 3 Sheets-Sheet 3

INVENTOR
KARL SPANGENBERG
BY
ATTORNEY

United States Patent Office 3,118,110
Patented Jan. 14, 1964

3,118,110
RADIO FREQUENCY SPECTRUM ANALYZER INCLUDING DISPERSIVE TRAVELING WAVE TUBE ELEMENTS
Karl Spangenberg, Palo Alto, Calif., assignor to The Board of Trustees of the Leland Stanford Junior University, Stanford University, Calif.
Filed July 15, 1952, Ser. No. 298,948
15 Claims. (Cl. 324—77)

This invention relates to improvements in radio frequency spectrum analyzers or panoramic receivers, particularly those of the type which scan periodically over a band of frequencies to detect and indicate the existence of signals whose frequencies are within said band.

Receivers of this general type have been built and used, but their applications have been limited mostly to relatively low frequency continuous wave signals, owing to their low scanning rates. The term "scanning rate" is defined as the width of the band which is scanned, times the scanning frequency, and is the rate of change of frequency, e.g. cycles per second per second, or megacycles per second per second.

Prior art receivers for covering wide bands have usually been turned by mechanical means, such as a motor driven variable capacitor. This necessitates a low scanning frequency, hence a low scanning rate. Higher scanning frequencies have been obtained by electronic tuning, for example by means of reactance tube circuits, but at the expense of a narrow bandwidth.

With low scanning rates, the average time between signal interceptions may be as much as several minutes if the signals are pulsed, and are being transmitted by a directive antenna which is rotating in azimuth. This time is much too long for some purposes, for example when it is desired for a rapidly moving aircraft to detect, and evade detection by, a ground-based search radar system.

The principal object of the present invention is to provide panoramic or intercept receivers capable of rapid electronic scanning over extremely wide bands.

Another object is to provide wide band scanning receivers having a sensitivity great enough to respond to a pulsed signal, such as a radar signal, at a distance beyond the maximum range of a radar system.

Figure 1:
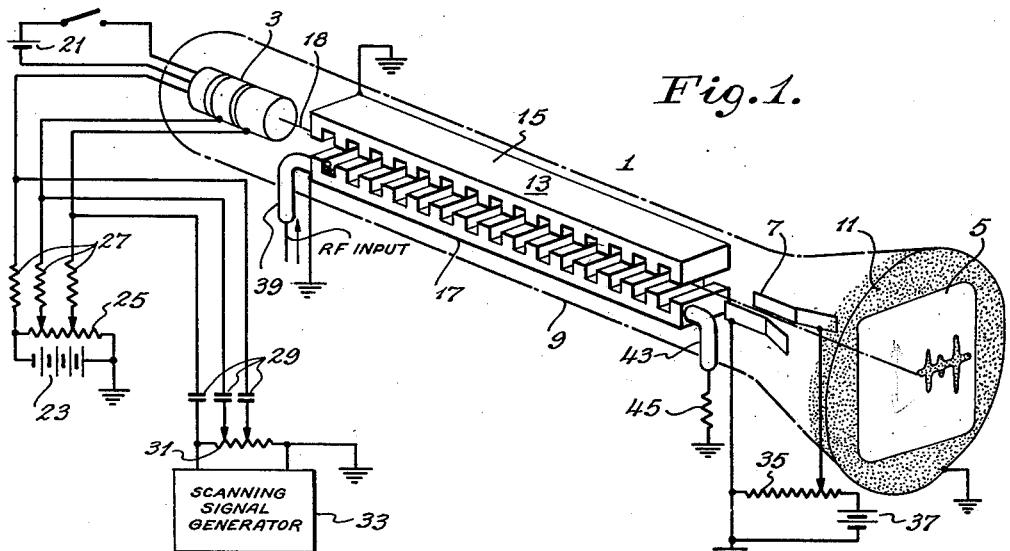
Figure 2:
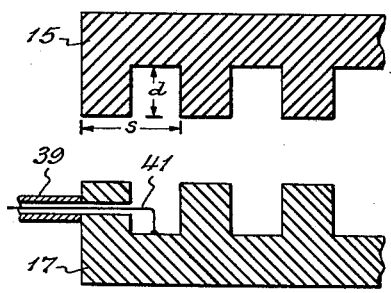
Figure 3:
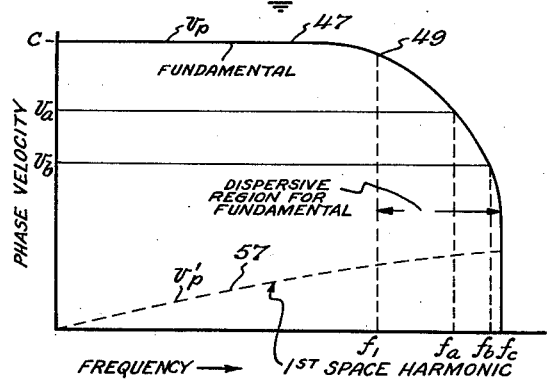
Figure 4:
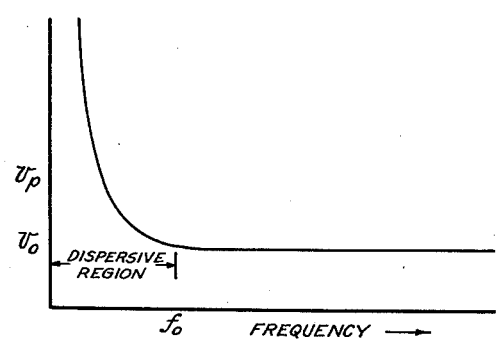
Figure 5:
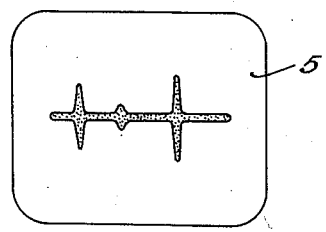
Figure 7:
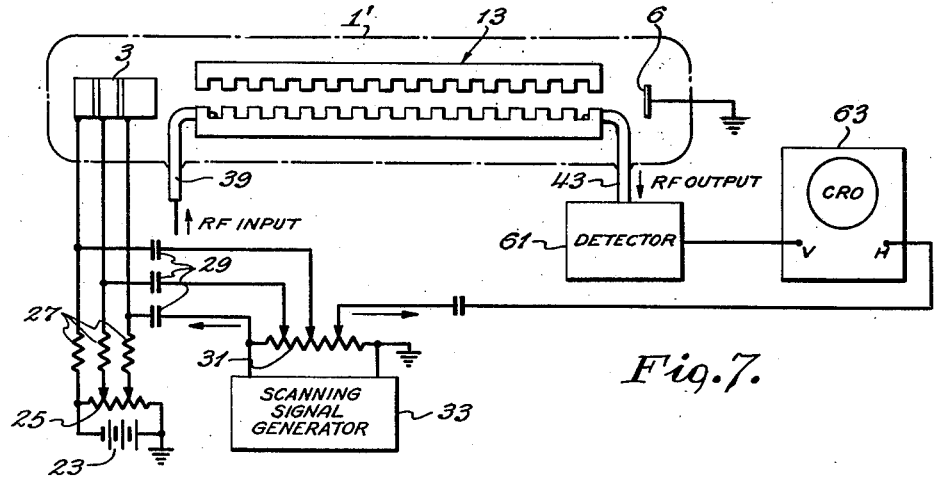
Figure 8:
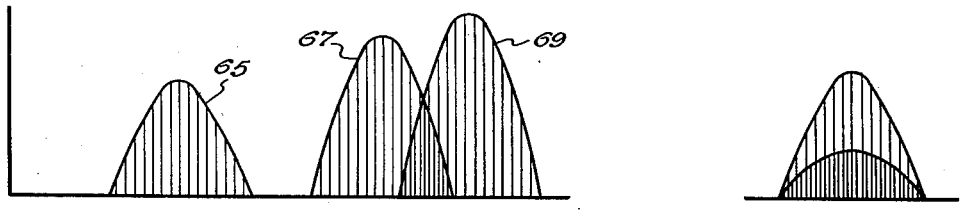
Figure 9:
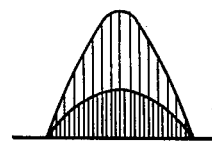
Figure 10:
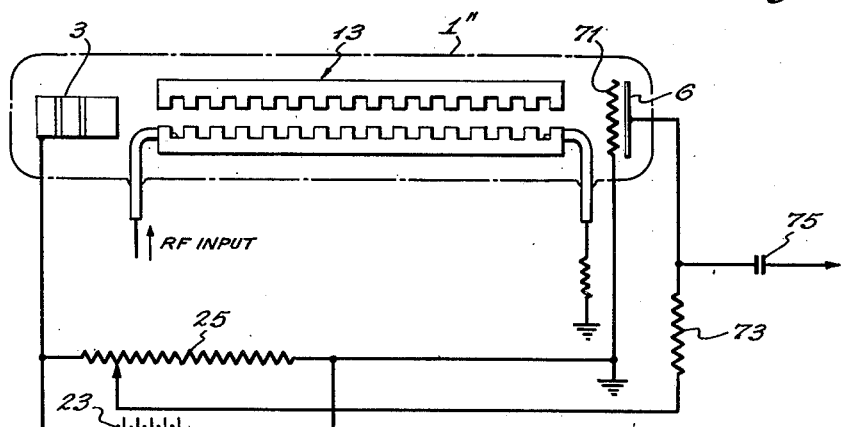
Figure 6:
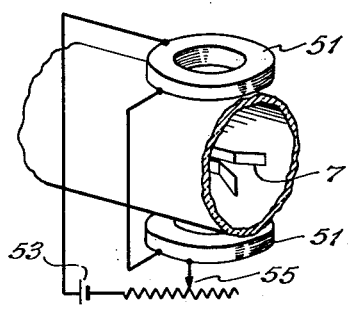
Figure 11:
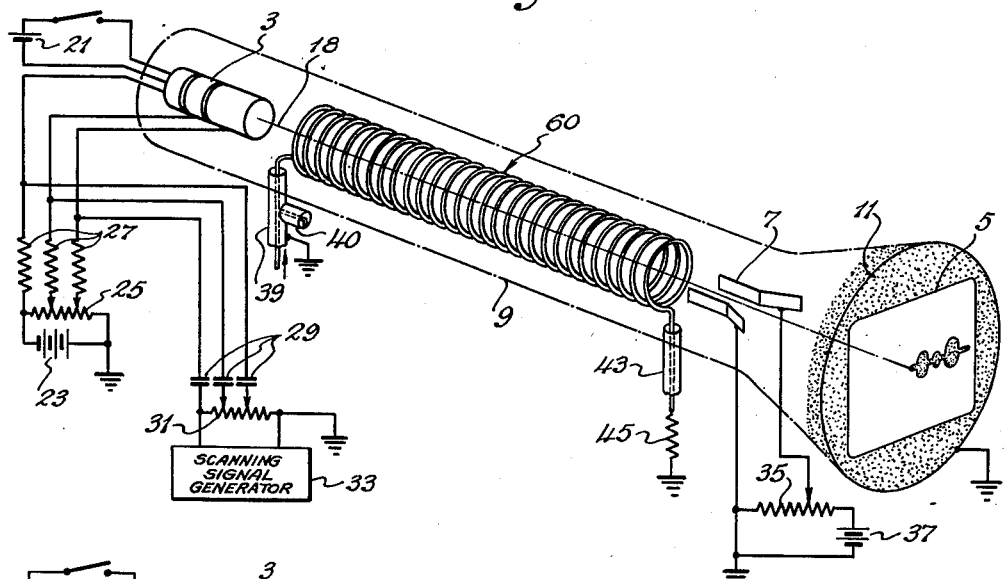
Figure 12:
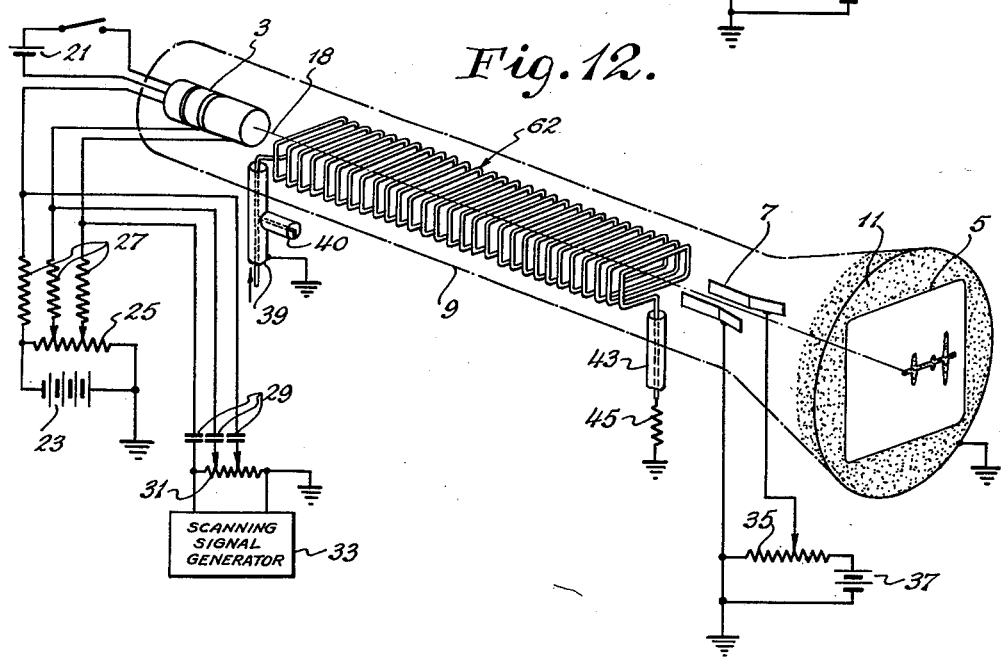

The invention will be described with reference to the accompanying drawings, wherein:

FIG. 1 shows a radio spectrum analyzer embodying the invention,

FIG. 2 is a detail drawing of a portion of the structure of FIG. 1 showing an arrangement for applying input signals thereto, FIG. 3 is a graph showing the relations between phase velocity and frequency on a periodically loaded transmission line such as may be used in the system of FIG. 1, FIG. 4 is a graph of phase velocity against frequency for a conductive helix which may be used in a system like that of FIG. 1, FIG. 5 shows a typical display produced by the system of FIG. 1 in response to input signals of differene frequencies and amplitudes, FIG. 6 shows a modification of the system of FIG. 1 using crossed magnetic and electric fields for sorting electrons according to their velocities, FIG. 7 is a schematic diagram of a modification of the invention, FIGS. 8 and 9 are representations of typical indications provided by the system of FIG. 7, FIG. 10 is a schematic diagram showing a further modification of the system of FIG. 7, FIG. 11 shows a radio spectrum analyzer including a helical wave propagating structure of circular cross section, and FIG. 12 shows a radio spectrum analyzer including a helical propagating structure of oblong cross section.

According to the present invention, rapid scanning over a wide frequency band is effected by means of a travelling wave amplifier capable of operating as a filter with a narrow pass band that can be moved over a wide frequency range by variation of an applied control voltage. As the voltage is varied, the amplifier will provide output only when the voltage corresponds to the frequency of an input signal. Thus the frequencies of any input signals may be determined from the respective values of the control voltage required in order for them to be amplified.

Referring to FIG. 1, a special travelling wave tube 1 is used both as a tunable filter and as a visual indicator. This tube may resemble an ordinary cathode ray oscilloscope tube in several respects, being provided with an electron gun 3, a fluorescent screen 5, and horizontal deflection electrodes 7. The electron gun 3 includes cathode, focussing, and accelerating electrodes. The vacuum envelope 9 may be made of metal, with a glass window for the screen 5, or it may be made entirely of glass. In the latter event, the inside of the envelope may be provided with a conductive coating 11, such as finely divided carbon, in the vicinity of the screen 5.

In addition to the foregoing elements, all of which may be similar or identical to those used in oscilloscopes, the tube 1 is provided with a travelling wave propagating structure or transmission line 13 extending between the gun 3 and the deflecting electrodes 7. In the form illustrated in FIG. 1, the line 13 comprises two parallel conductive bars or plates 15 and 17 disposed respectively above and below the path 18 of the electron beam which is produced by the gun 3, and provided with regularly spaced corrugations or teeth similar to a gear rack. Corresponding teeth on the upper and lower racks are juxtaposed so that the members 15 and 17 cooperate to form a two-conductor line or wave guide having periodc variations in cross section along its length. Alternatively, one of the conductors 15 and 17 may be left smooth, and only the other one provided with teeth.

Electric current for heating the cathode of the gun 3 is provided by an external source such as battery 21. A relatively high voltage source 23 is connected to apply appropriate D.-C. voltages, by way of a voltage divider 25, to the focussing and accelerating electrodes. The positive terminal of the source 23 may be grounded, so that the gun electrodes are maintained at high negative D.-C. potentials with respect to ground. In this case, the line 13 and the second anode 11 may be grounded also.

The connections between the voltage divider 25 and the gun electrodes include resistors 27, to provide impedances for coupling said electrodes, through capacitors 29 and another voltage divider 31, to a scanning signal generator 33. The generator 33 is designed to produce an output voltage which varies, preferably cyclically, as a function of time. The taps on the voltage divider 31 are adjusted to make the amplitudes of the scanning signal at the various gun elements have substantially the same ratios to each other as the respective D.-C. voltages applied thereto.

With this arrangement, the variations in instantaneous value of the scanning signal causes the electron beam velocity to vary correspondingly, without defocussing the beam. The relationship between beam velocity and scanning voltage is not linear since the beam velocity is proportional to the square root of the total accelerating potential. However, the beam velocity may be made to be substantially any desired function of time by designing the scanning signal generator 33 to produce the proper wave shape.

The horizontal deflection electrodes 7 are connected to a voltage divider 35 across a D.-C. source 37. If desired, the source 37 may be omitted and the voltage divider 35 may be connected to suitable points on the source 23. Adjustment of the voltage divider 35 operates similarly to the centering adjustment in a cathode ray oscilloscope, to move the zero or static position of the beam laterally of the fluorescent screen 5.

Radio frequency input signals may be applied to the end of the line 13 nearer the electron gun 3 by means of a coaxial transmission line 39. FIG. 2 shows how the line 39 may be coupled to the line 13. The outer conductor of the coaxial line 39 is connected to the end of the lower conductor 17 of the line 13. The inner conductor of the coaxial line extends through a hole in the first tooth of the member 17, and is bent around and connected to the bottom of the adjacent slot, forming a small coupling loop 41. The other end of the line 13 may be coupled similarly to a coaxial line 43. The line 43 may be connected to a utilization device such as a detector, or it may be terminated by a resistor 45 as shown.

The spacing $s$ between the teeth on the line conductors 15 and 17, and the depth $d$ of the slots between the teeth (see FIG. 2) are determined by the frequency range over which the system is to operate, the electron velocities to be used, and the manner in which the line 13 is to function as a wave propagation device.

The phase velocity on the line 13 (i.e. the velocity of propagation of a phase front) is shown by the graphs of FIG. 3. The principal, or "fundamental" component of the electromagnetic field has a phase velocity as represented by the solid line 47. This velocity is substantially the same as the free space velocity $c$, up to a point 49 at the frequency $f_1$, where the free space wavelength $\lambda$ begins to approach four times the slot depth.

As the frequency is increased, the phase velocity decreases asymptotically toward zero at the frequency where the effective slot depth is $\lambda/4$. Cutoff actually occurs at a frequency $f_c$ somewhat lower than the slot resonance.

The variation of velocity with frequency is known as "dispersion." The structure whose characteristics are represented in FIG. 3 is dispersive throughout the range from the frequency $f_1$ to the frequency $f_c$. The phase velocity at $f_c$ is approximately $$\frac{s}{2d}c$$

and may be of the order of one tenth to one twentieth the velocity of light in a typical structure.

In designing the line 13 to operate in the system of FIG. 1 in the fundamental mode, the cutoff frequency $f_c$ is made slightly higher than the highest frequency $f_b$ with which the system is to be used. Referring to FIG. 3, the phase velocity, at the frequency $f_b$, is $v_b$. The structure must be designed so that the phase velocity $v_a$, at the lowest frequency $f_a$ to be used, must be at least as low as the highest electron stream velocity that can be attained by the application of permissible voltages to the electron gun 3. This can be done, providing the frequency range $f_b$—$f_a$ is not too great. The shape of the curve 47, and hence the velocity range $v_a$—$v_b$, depends upon the slot depth, and it can also be controlled to some extent by adjustment of the spacing between the upper and lower line conductors to change the capacitances between corresponding teeth on the two conductors.

In the operation of the system of FIG. 1 with the line 13 designed as described, the voltage dividers 25 and 31 are adjusted to make the electron beam from the gun 3 remain focussed while the electron velocity varies cyclically between $v_a$ and $v_b$. With no input signals applied to the line 39, and no voltage between the horizontal deflection plates 7, this would produce a luminous spot approximately at the center of the screen 5. With a D.-C. voltage between the plates 7, the beam is deflected laterally by an amount which depends on its velocity, the deflection being greatest when the velocity is lowest. Since the velocity is varying cyclically, the deflection varies accordingly, causing the spot to appear to be drawn out into a horizontal line, starting near the center of the screen and extending to one side. The length of the line may be adjusted by means of the voltage divider 35.

Radio frequency signals to be analyzed or indicated are applied to the input line 39, and produce corresponding electromagnetic fields travelling along the line 13 with phase velocities which depend upon their respective frequencies according to the relationship indicated by the curve 47 of FIG. 3. In a toothed line structure like that shown in FIG. 1, the electric components will be mostly transverse to the direction of wave propagation, i.e. up and down. At each instant during a scanning cycle when the beam velocity is the same as the phase velocity of a particular field component, each electron in the stream will be subject, during its passage along the line 13, to a unidirectional electric field.

The value of this field, and its direction, depend upon the position of the particular electron with respect to the wave on the line. Thus some of the electrons will be subject to upwardly directed fields, and be deflected up; some will be in downward fields and be deflected down, and the amount of deflection in each case will depend upon the space phase relationship of the electron to the field.

Deflection of the electrons by the field across the line 13 causes the beam to spread out vertically when the beam velocity corresponds to the wave velocity. Since the beam is also deflected laterally according to its velocity, the luminous trace appearing on the screen 5 will be spread vertically at a lateral position which depends upon the frequency. FIG. 5 shows a typical display, in which three signals of different frequencies are represented. The extent of the vertical spread in each case depends on the amplitude of the respective signal.

With the lateral deflection system shown in FIG. 1, the entire display will be on one side of the undeflected position of the beam. It may be centered on the screen 5 by constructing the tube with the screen in an offset position. Another way of centering the display is shown in FIG. 6, where a pair of magnetic deflection coils 51 are disposed with their axis vertical to provide lateral deflection of the beam. The coils 51 may be supplied with current from a suitable D.-C. source 53, through a rheostat 55. The polarity and strength of the current is made such that the magnetic and electrostatic deflections just cancel each other for electrons at some selected velocity in the operating range $v_a$—$v_b$.

The magnetic deflection, for a constant field, is inversely proportional to the electron velocity. The electrostatic deflection is inversely proportional to the square of the velocity. Thus the two types of deflection are balanced only at the selected mid-range velocity, and the beam is deflected one way from its center position for lower velocities and the other way for higher velocities.

Besides producing the above described vetrical spreading of the beam, the line 13 may cooperate with the electron beam to produce some amplification of the signals. This comes about by virtue of the fact that the fields in the space between the line conductors, although primarily transverse to the direction of electron flow, will fringe out at the edges of the teeth. The resulting longitudinal components of electrical field will interact with electrons which are not on the exact center axis of the structure, in the manner of a conventional traveling wave tube.

Such amplification will increase the vertical spreading of the beam when the electron velocity coincides with that of a travelling wave. The wave energy, amplified or not, which reaches the end of the line 13 is taken off by the output line 43 and dissipated in the load 45. Alternatively, the line 13 may be made dissipative, for example by coating it internally near its output end with lossy material.

A periodic structure such as the line 13 carrying an electromagnetic wave exhibits so-called "space harmonics." These are a series of field components, all travelling with the same group velocity as the fundamental field, but with phase velocities which are progressively lower in accordance with the order of the harmonic. Their amplitudes with respect to that of the fundamental are also progressively lower according to the order, so usually only the first space harmonic is of interest in travelling wave tubes.

Referring to FIG. 3, the phase velocity $v'_p$ of the first space harmonic on the line 13 is represented by the dash line curve 57. At the cutoff frequency $f_c$, the phase velocity $v'_p$ is exactly one third the fundamental phase velocity $v_p$. Unlike the fundamental, the space harmonic transmission is dispersive throughout the whole range from zero frequency to $f_c$, the phase velocity $v'_p$ increasing almost linearly with increasing frequency.

The system of FIG. 1 may be arranged to use the space harmonic mode over substantially any desired frequency band by designing the line 13 accordingly. The cutoff frequency, as in the fundamental mode, depends upon the dimensions of the structure according to well known circuit theory. The phase velocity $v'_p$ at cutoff is about $$\frac{s}{6d}c$$

The dimensions $s$ and $d$ are selected, with regard to the variation in electron beam velocity to be used, to provide corresponding variation in $v'_p$ over the desired frequency range.

Space harmonic operation of the system of FIG. 1 is generally similar to fundamental operation, except as modified by the different type of dispersion. Since the space harmonic dispersion is negative, the polarity of the static deflection source 37 must be opposite to that used for fundamental operation, if the higher frequency signals are to be indicated to the right of the display, for example, in both cases.

A different modification of the structure of FIG. 1 involves the use of a conductive helix instead of the parallel conductor line 13. The helix may be arranged to surround the path of the electron beam as in helix type travelling wave amplifiers. In order to provide the required dispersion, the helix must be designed with a finer pitch and preferably with a smaller diameter than would be used in an ordinary travelling wave tube intended for the same frequency range.

FIG. 4 shows how the phase velocity on a conductive helix varies with frequency. Above some frequency $f_o$, the velocity $v_o$ is substantially constant at a value about equal to the axial component of velocity of a wave travelling along the helix conductor at the velocity of light. Below the frequency $f_o$, the velocity increases with decreasing frequency as shown in FIG. 4. In the present case, a portion of the indicated dispersive region is used. Within the limits imposed by practical considerations such as constructing and supporting the helix and projecting an electron beam through it, the helix may be designed for substantially any desired frequency range.

FIG. 11 shows a radio frequency spectrum analyzer similar to that of FIG. 1 but including a dispersive helix 60 is substantially like that with the parallel conductive helix of circular cross section instead of the propagating structure 13. The operation with dispersive helical 60 is substantially like that with the parallel conductor line 13. Corresponding reference numerals are used in parts of the arrangement of FIG. 11 which are similar to corresponding parts of FIG. 1. Suitable input and output coupling means such as those used in ordinary helix amplifiers may be provided for connecting the helix to the input and output lines 39 and 43. A conventional short-circuited quarter wavelength stub line 40 may be coupled to the input line 39 to enable helix 60 to be maintained at a D.-C. ground potential. Since the helix is actually a repetitive or periodic structure, it will also exhibit space harmonics, and may be designed to utilize them in a manner analogous to space harmonic operation with a corrugated parallel plate line.

The electric fields in the helix 60 are primarily longitudinal, but have transverse components except along the exact central axis. With a helix of circular cross section, the beam will be spread out transversely in all directions by any fields with which it synchronizes, and the display on the screen 5 will consist of enlarged circular luminous areas centered at positions corresponding to the respective frequencies as is shown in FIG. 11. The screen 5 should be spaced far enough from the plates 7 so that the horizontal trace on screen 5 will be wide enough to provide the proper resolution.

To provide a display similar to that of FIG. 5, the helix may be made of oblong cross section with its wide dimension horizontal. Such a helix is shown in FIG. 12, where conductive helix 62 of oblong cross section comprises the wave propagating structure of the spectrum analyzer. The rest of the system of FIG. 12 is similar to that of FIG. 11.

In considering the operation of the system of FIG. 1, the dispersive line 13 or its equivalent may be regarded as a peculiar sort of vertical deflection device, which works only at the frequency that corresponds to the beam velocity. However, it will be observed that the disperive line also cooperates with the electron beam to act as a selective filter, with a pass band at a frequency which depends on the beam velocity. The radio frequency output of the filter appears on the line 43, and in the system of FIG. 1 it is not used, but dissipated in the resistor 45.

FIG. 7 shows a modified system including a travelling wave tube 1' which may be similar to the tube 1 of FIG. 1 but with the fluorescent screen 5 omitted, and a collector electrode 6 substituted for the purpose of collecting the electrons after their passage along the line 13. Scanning signal and D.-C. potentials may be supplied to the electron gun 3 as in the system of FIG. 1.

The output line 43 is connected to a detector 61, which may be a crystal detector. The output of the detector is applied to the vertical deflection input terminal of a cathode ray oscilloscope 63, which may be of conventional design. The scanning signal voltage divider 31 is provided with an additional tap which is coupled to the horizontal deflection system of the cathode ray oscilloscope, either directly or in such known manner as to synchronize an internal scanning signal generator.

In the operation of FIG. 7, the cathode ray beam of the oscilloscope 63 is swept horizontally in synchronism with the variation in velocity of the beam in the tube 1'. Whenever this velocity coincides with the phase velocity of a radio frequency signal on the dispersive line 13, said signal is amplified, rectified in the detector 61, and it deflects the beam in the oscilloscope 63 vertically.

FIG. 8 shows a typical display on the screen of the oscilloscope, resulting from three pulse modulated signals of different carrier frequencies and different amplitudes. The indications 65, 67 and 69 are centered at positions laterally of the screen corresponding to the respective frequencies, and have amplitudes corresponding to those of the signals they represent. Where the indications overlap, as between 67 and 69 in FIG. 8, they may be distinguished from each other because their pulse modulations will generally not be synchronous, even if they are of substantially the same repetition rate. In fact, two different pulsed signals of identical carrier frequency are distinguishable, as illustrated in FIG. 9.

A further modification of the invention is illustrated in FIG. 10. Here the tube 1" is like the tube 1' of FIG. 7, but is provided with an additional electrode such as a grid 71, between the end of the line 13 and the collector 6. The electrode 71 may be grounded as shown, and a load resistor 73 is connected to the collector 6. The lower end of the resistor 73 may be grounded also, or returned to a tap on the D.-C. power supply voltage divider 25. The collector is coupled by way of a blocking condenser 75 to an indicating system, such as the vertical deflection terminal of an oscilloscope like the device 63 of FIG. 7.

The operation of the system of FIG. 10 is identical with that of FIG. 7, except that detection is provided by the electrodes 6 and 71 instead of the external detector 61. It should be noted that in both the systems of FIG. 7 and FIG. 10, the electron beam in the travelling wave tube does not need to be deflected or spread out to provide the desired indications. Therefore the line 13 may be any known type of dispersive structure, including one with substantially pure longitudinal fields in the interaction region. This has the advantage that the beam may be magnetically focussed without interfering with the operation of the indicator.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A radio frequency spectrum analyzer including a cathode ray tube having a fluorescent screen, an electron gun adapted to produce a beam of electrons and project said beam at said screen, a vertical deflection means comprising a frequency dispersive electromagnetic wave conductor with its axis of wave propagation substantially coincident with the path of said electron beam, means for applying input signals to be analyzed to said wave conductor to produce travelling waves thereon, means coupled to said electron gun to vary the velocity of the beam produced thereby, and horizontal deflection means adjacent the path of said beam between said electron gun and said screen for deflecting said beam laterally in accordance with its velocity.

2. The invention set forth in claim 1, wherein said horizontal deflection means includes a pair of electrodes on opposite sides of said path, means for establishing a substantially constant electric field between said electrodes, and means for producing a substantially constant magnetic field at right angles to said electric field and to said beam.

3. A radio frequency spectrum analyzer system including a travelling wave tube having a dispersive wave guide and an electron gun adjacent one end of said guide arranged to project a beam of electrons along the axis of wave propagation of said guide, means for applying input signals to be analyzed to said end of said guide, a scanning signal generator coupled to said electron gun to vary the velocity of said electron beam, visual indicator means including a fluorescent screen and means including said beam for producing a luminous trace on said screen at a lateral position corresponding to the velocity of said beam and of a vertical dimension depending upon the extent of modulation of said beam by said signals.

4. A radio frequency spectrum analyzer system including a travelling wave tube having a dispersive wave guide and an electron gun adjacent one end of said guide arranged to project a beam of electrons along the axis of wave propagation of said guide, means for applying input signals to be analyzed to said end of said guide, detector means coupled to the other end of said guide, a scanning signal generator coupled to said electron gun to vary the velocity of said electron beam, and a cathode ray oscilloscope with vertical deflection means coupled to said detector and horizontal deflection means coupled to said scanning signal generator.

5. A spectrum analyzer system for radio frequency signals whose frequencies are within a predetermined acceptance band, including a travelling wave tube with a wave propagating structure designed to carry travelling waves with phase velocities which depend upon the frequencies of such waves, means for applying input signals to be analyzed to said structure, said tube further including electron gun means for producing and directing a beam of electrons along said structure in energy interchanging relationship with waves travelling thereon, scanning means including a source of cyclically varying control voltage and means energized by said source to periodically vary the velocity of said electrons throughout a range conforming to the range of variation of phase velocity of waves on said propagating structure with frequency over said acceptance band, whereby correspondence in velocity between said beam and waves on said structure, and interaction between the beam and the waves, occurs only at instants during each scanning cycle which correspond to the frequencies of such waves, and means responsive to the time relationship between such interactions and said cyclically varying control voltage to indicate the frequencies of said input signals.

6. A spectrum analyzer system as set forth in claim 5, wherein said wave propagating structure comprises a conductive helix disposed along the path of said beam.

7. A spectrum analyzer system as set forth in claim 6, wherein said helix is of substantially circular cross section.

8. A spectrum analyzer system as set forth in claim 5, wherein said wave propagating structure comprises a conductive helix of oblong cross section disposed along the path of said beam.

9. A spectrum analyzer system as set forth in claim 5, wherein said wave propagating structure comprises two parallel conductive plates disposed respectively above and below the path of said beam of electrons, at least one of said plates being transversely corrugated, said plates cooperating to form a wave guide having periodic variations in cross section along its length.

10. A spectrum analyzer as set forth in claim 5, wherein said wave propagating structure comprises two parallel conductive plates disposed respectively above and below the path of said beam of electrons, at least one of said plates including a plurality of transverse teeth spaced apart therealong to periodically load said wave propagating structure, one of said teeth adjacent the input of said structure having an aperture therethrough, said means for applying said input signals to said propagating structure comprising a coaxial line having its outer conductor connected to said one tooth with its inner conductor extending through said aperture and forming a loop terminated on an indented portion of said one of said plates adjacent said one tooth.

11. A spectrum analyzer system for radio frequency signals, including a travelling wave tube comprising a dispersive slow wave propagating structure, and an electron gun for producing and directing a beam of electrons longitudinally of the axis of wave propagation along said structure, means for applying input signals to said tube to produce travelling waves on said structure, means for varying the velocity of said electrons to vary the frequency at which substantial interaction occurs between said electrons and waves travelling along said structure, and utilization means coupled to said beam and responsive to the relationship between said interactions and said electron velocity to indicate the frequencies of said input signals.

12. A spectrum analyzer system for radio frequency signals, including a wave propagating structure designed to carry travelling electromagnetic waves with phase velocities which depend upon the frequencies of such waves, and means for applying input signals to be analyzed to said structure to produce waves thereon, means for producing and directing a beam of electrons along said structure in energy interchanging relationship with waves travelling on said structure, a source of scanning signal and means energized by said source to vary the velocity of said electrons, whereby correspondence in velocity between said beam and waves on said structure, and interaction between the beam and the waves, occurs substantially only when the instantaneous value of said scanning signal corresponds to a value having a given relationship to the frequencies of such waves, and utilization means coupled to said electron beam and to said scanning signal source.

13. A spectrum analyzer system for radio frequency signals, including a travelling wave tube comprising a slow wave propagating structure, said structure being dispersive throughout a certain frequency band, and an electron gun for producing and directing a beam of electrons longitudinally of the axis of wave propagation along said structure, means for applying input signals to said tube to produce travelling waves on said structure, a source of variable voltage and means for varying the velocity of said electrons according to variation of said voltage to vary the frequency at which substantial interaction occurs between said electrons and waves travelling along said structure, and utilization means responsive jointly to such interaction and to said variable voltage.

14. A spectrum analyzer system for radio frequency signals whose frequencies are within a predetermined acceptance band, including a travelling wave tube of the type comprising a loaded wave conductor, said wave conductor being dispersive throughout said acceptance band, and an electron gun for producing and directing a beam of electrons longitudinally of the axis of wave propagation along said wave conductor, means for applying input signals to said wave conductor to produce travelling waves thereon, a source of variable voltage and means connected to said source for varying the velocity of said beam according to variation of said voltage to vary the frequency at which waves travelling along said wave conductor produce substantial modulation of said beam, and utilization means coupled to said beam and responsive to modulation of the beam and to said variable voltage to indicate the frequencies of said input signals.

15. A spectrum analyzer system for radio frequency signals, including a wave propagating structure designed to carry travelling electromagnetic waves with phase velocities which depend upon the frequencies of such waves, means for applying input signals to be analyzed to said structure to produce waves thereon, and means for producing and directing a beam of electrons along said structure in energy interchanging relationship with waves travelling on said structure, a source of scanning signal and means connected to said source and energized thereby to vary the velocity of said electrons, whereby correspondence in velocity between said beam and waves on said structure, and modulation of the beam by the waves, occurs substantially only when the instantaneous value of said scanning signal corresponds to a value having a given relationship to the frequencies of such waves, and utilization means coupled to said beam and responsive to the relationship of such modulation to said scanning signal to indicate the frequencies of said input signals.

References Cited in the file of this patent
UNITED STATES PATENTS

| | | |
|---|---|---|
| 2,154,127 | Hollmann | Apr. 11, 1939 |
| 2,535,317 | Pierce | Dec. 26, 1950 |
| 2,608,669 | Hurvitz | Aug. 26, 1952 |
| 2,611,103 | Hollenberg | Sept. 16, 1952 |